Patented Nov. 3, 1936

2,059,789

UNITED STATES PATENT OFFICE 2,059,789

PROCESS FOR TREATING FRUIT JUICE

George Grindrod, Oconomowoc, Wis., assignor to Grindrod Process Corporation, Dover, Del., a corporation of Delaware No Drawing. Application February 14, 1935, Serial No. 6,485

7 Claims. (Cl. 99—155)

This invention pertains to a process for treating fruit juice and relates more particularly to a process for preserving fruit juice.

It is an object of the invention to provide a practical commercially operable process for preserving fruit juice, particularly orange juice, by which process extracted orange juice is canned without appreciably changing its natural flavor and color and which canned product can be kept at normal temperatures without refrigeration and for appreciable lengths of time without undergoing objectionable spontaneous or objectionable chemical changes.

Another object is to provide a canned juice, particularly orange juice, which will keep appreciable lengths of time without deterioration and which has retained practically unchanged its original flavor and color.

Other objects will be in part obvious and in part pointed out hereinafter.

This application is a continuation in part of my copending application Serial No. 393,113 entitled "Fruit juice products."

The invention comprises the several steps and sequence of steps, the selection of substances, the maintaining of desired proportions, conditions, etc. as exemplified in the embodiment hereinafter described and in the claims.

Orange juice and many other fruit juices after extraction from the fruit are susceptible to oxidation, bacteria and other influences which change the chemical and physical structure thereby changing the flavor, aroma, and color. Unless preserved, orange juice cannot be kept any apreciable length of time after extraction without undergoing these objectionable changes. Many methods have been tried in an effort to find one which would preserve the juice in its natural condition as extracted from the fruit but with none of these methods (without the aid of refrigeration) has it been possible to preserve the juice without materially changing its taste.

One of the methods tried, the customary prolonged heat treatment at 140-150° F. of canned or uncanned juice applied to destroy bacteria, not only destroys the bacteria but also changes the flavor and aroma, so as to render the juice unpalatable to many. Further, this treatment evidently renders the juice unstable for upon standing any appreciable length of time after treatment it becomes acrid, indicating a spontaneous chemical change probably prompted by the heat treatment. Thus the heat treatment tried caused thermo-chemical change in the fruit juice as well as sterilization. Another method, sterilization by filtration, is unsatisfactory because it removes color, taste and body, and is generally impractical with a pulp filled juice such as orange juice. Another method wherein the juice is not sterilized but is preserved by adding a substance such as sugar which inhibits bacterial growth changes the natural flavor.

Thus, all these processes produce changes in the fruit juice which make it taste quite different from that of the natural juice. It is another object of this invention to overcome these difficulties and to provide a process which preserves orange juice and other fruit juices without causing appreciable change in flavor and aroma, and which improves the stability of the juice.

The present invention contemplates a process comprising subjecting orange juice maintained at certain conditions of temperature and pressure to the action of heat and kinetic energy for a period of time sufficient to destroy harmful bacteria present but insufficient to cause objectional thermo-chemical changes in the fruit juice such as would cause an appreciable change in the taste. In the embodiment chosen to illustrate the invention the kinetic energy is provided by steam jets having apreciable velocity such as disclosed in my United States Patent 1,797,769.

Orange juice is extracted (preferably in a vacuum or in the presence of an inert gas since the juice is extremely sensitive to oxidation) and then the extracted juice is first preferably pre-heated in the absence of oxygen to a temperature between 120-130° F., in a suitable heat exchange apparatus in which localized over-heating is avoided. This may be accomplished in a suitable continuous flow heater with rapid movement of the juice therethrough. For this step and throughout the process acid resistant apparatus is considered preferable. By pre-heating the juice in this way the subsequent steam jet treatment does not cause as much dilution by condensation as would otherwise occur and the time required for the treatment is reduced. The juice may be heated to these temperatures for a reasonably short period of time without causing noticeable thermo-chemical decomposition of the juice.

The heated juice is next preferably subjected to a vacuum or low pressure, about 3 pounds per square inch absolute, wherein undesirable dissolved gases such as oxygen are released. An atmosphere free from oxygen such as dry steam has been found to be suitable to accomplish this step of the process. This step may be eliminated where the juice is free from oxygen or under certain other conditions of operation.

The gas-free pre-heated juice is now subjected to heat and kinetic energy by which the temperature of the juice is raised from the pre-heated temperature to that corresponding to 3 pounds per square inch absolute which is maintained. In the present embodiment this is accomplished by introducing into the liquid body of the juice steam jets having a high velocity, for example, at or above 1400 feet per second. The steam jets may be similar to those described in the above-mentioned patent. The 3 pound absolute pressure may be maintained by drawing off the steam and water vapor by a suitable mechanism such as, for example, a water jet ejector, a steam vacuum pump, or the like. This step of the process is started and preferably carried out in an enclosed space free from oxygen and other gases deleterious to the juice by first flushing with steam the space in which the process is being carried out. It is also preferable that the steam used be free from oxygen and oxides such as rust, and to this end, the water used is first preferably freed from oxygen and suitable precautions are taken to prevent any rust reaching the place of steam jet treatment. Also the enclosure should be large enough to allow the steam jets effectively to impart their kinetic energy to the orange juice and should be designed so that the steam in passing from the enclosure does not carry the orange juice with it. When working with a batch process it has been demonstrated that a container 20 per cent filled with orange juice gives satisfactory results.

Further experiments have demonstrated that the steam jets should be dry and to insure the dryness should have some superheat. Thus, it has been found practical to start with steam at about 100 pounds per square inch gauge, adiabatically expand it down to about 5 pounds per square inch gauge and then pass it through either orifices or adiabatic nozzles to form it into jets which contact directly with the orange juice.

It has been found that, when working with a batch process and with steam jets having a velocity of approximately 1400 feet per second the steam treatment raises the temperature almost instantly to that which corresponds to the 3 pounds absolute pressure (about 140° F.) and that by continuing this kinetic energy and heat treatment for a period of one to two minutes the juice is sterilized. The juice is then immediately cooled to a temperature below that which causes thermo-chemical decomposition (for example 110° F.). My results have demonstrated that the destruction of the bacteria harmful to the juice is accelerated by my process to a degree much out of proportion to thermo-chemical changes affecting other constituents of the juice so that the bacteria are devitalized before objectional thermo-chemical changes take place. Further the juice is stable and has been found to keep without deterioration for periods of time much longer than juice sterilized or pasteurized by the slow heat treatment processes.

The immediate cooling of the juice may be accomplished by running the sterile juice into a vacuum containing a pressure lower than 3 pounds per square inch absolute whereby rapid boiling and consequent evaporation of the water of the juice immediately lowers the temperature. Further cooling of the product before bottling may be accomplished by suitable heat exchange apparatus. The two stage cooling has been found desirable to accomplish the first immediate cooling very rapidly so that the product could be lowered below the temperature at which thermo-chemical change may take place before such change has an opportunity to take place. The product is now ready for bottling providing the concentration is correct. If it is desired to change the concentration by reducing it, of course heat may be supplied while the product is in the cooling vacuum chamber to remove as much water as is desired.

Inasmuch as the more important flavor giving constituents of orange juice are considered to have a low vapor pressure, the steam jet treatment should not distill these off and my experiments have indicated that the steam treatment does not distill off an amount of these constituents sufficient to cause any appreciable change in the taste of the juice.

The results obtained by my experiments have indicated that exact conditions of temperature and pressure as well as conditions of atmosphere and periods of time should be closely adhered to in order to obtain maximum favorable results. For example, by raising the temperature to 150° F. the time required for obtaining sterility is generally materially reduced, and in some instances to less than a minute. I have found that when working with a batch process when the temperature is raised above 155° F. even though the time is reduced the quality of the product obtained is likely to be inferior to that processed at a lower temperature. Also with regard to the temperature of the steam employed, experiments have demonstrated that if the temperature is much above 230° F., a less perfect steam jets is obtained. The number of degrees of superheat is not important but by having 5° to 10° of superheat a sufficient factor of safety is provided for the assurance of dry steam. Wet steam while it may be used is not as satisfactory as dry steam because of its tendency to condense and so dilute the product and also because of its slower speed.

It has been found that the process is equally adaptable to orange juice that has been diluted, concentrated or left as it is extracted, whereas concentrated juice will withstand practically no heating by the usual heat treatment. Usually, however, the juice is concentrated for bottling after the heat treatment and as above described this may be carried out in the vacuum cooler used for the first cooling step.

With the process described it is possible to preserve fruit juice and particularly orange juice without appreciably changing the flavor, aroma or color of the juice, the juice being preserved so that it is stable for an appreciable length of time. As has been pointed out, although various heat treatments have been proposed in the past, none of them have succeeded in sterilizing the juice without causing thermo-chemical changes to take place either at the time of the heating or spontaneously thereafter. With the temperature limits and steam or kinetic energy treatment described the heat treatment of the present invention sterilizes the juice before any thermal decomposition takes place and without causing thermo-chemical changes which may later spontaneously cause a change in the taste.

As various embodiments might be made of this invention, and as various changes might be made in the process herein described, all without departing from the scope of the invention, it is to be understood that all matter herein set forth is to be interpreted as illustrative and not in a limiting sense.

I claim:

1. A process for preserving orange juice comprising the steps of rapidly pre-heating the juice out of the presence of air to a temperature below that necessary to cause thermo-chemical change, subjecting it to a low pressure approximately 3 pounds per square inch absolute and comprising an atmosphere of steam whereby dissolved gases may escape, subjecting the juice to the heat and kinetic energy of high velocity dry super-heated steam jets not over 230° F. while maintaining the 3 pounds per square inch pressure absolute to heat the juice to a temperature corresponding to the 3 pounds per square inch absolute pressure and continuing the heat treatment for approximately two minutes until sterility is obtained but before appreciable thermo-chemical change is produced, and then instantaneously cooling the juice to a temperature below that necessary to produce thermo-chemical change by subjecting the juice to a low vacuum.

2. A process for preserving orange juice comprising the steps of pre-heating the juice out of the pressure of air to a temperature below that necessary to produce thermo-chemical change, subjecting the juice to the heat and kinetic energy of high velocity steam jets not over 230° F. to raise the temperature of the juice approximately instantaneously to between 140°–155° F., and continuing the heat treatment while maintaining said temperature until the product is sterilized but stopping before appreciable thermo-chemical change is produced, and then approximately instantaneously cooling the juice to a temperature below that necessary to produce thermo-chemical change by subjecting the juice to a vacuum sufficient to cause it to boil.

3. A process for preserving orange juice comprising the steps of rapidly pre-heating the juice out of the presence of air to a temperature below that necessary to cause thermo-chemical change, subjecting the juice to the heat and kinetic energy of high velocity super-heated steam jets while maintaining the pressure surrounding the juice at approximately 3 to 4 pounds per square inch absolute to heat the juice to a temperature corresponding to the pressure and continuing the heat treatment for approximately two minutes until sterility is obtained but stopping before appreciable thermo-chemical change is produced and then substantially instantaneously cooling the juice to a temperature below that necessary to produce thermo-chemical change.

4. A process for preserving orange juice comprising the steps of rapidly pre-heating the juice out of the presence of air to a temperature below that necessary to cause thermo-chemical change, subjecting the juice to the heat and kinetic energy of high velocity super-heated steam jets while maintaining the pressure above the juice at approximately 3 to 4 pounds per square inch absolute to heat rapidly the juice to a temperature corresponding to the pressure and continuing the heat treatment until sterility is obtained but stopping before appreciable thermo-chemical change is produced.

5. A process for preserving orange juice comprising the steps of rapidly pre-heating the juice out of the presence of air to a temperature below that necessary to cause thermo-chemical change, subjecting the juice to the heat and kinetic energy of high velocity dry steam jets while maintaining the pressure above the juice at approximately 3 to 4 pounds per square inch absolute to heat rapidly the juice to a temperature corresponding to the pressure and continuing the heat treatment until sterility is obtained but stopping before appreciable thermo-chemical change is produced.

6. A process for preserving orange juice comprising the steps of subjecting the juice to a low pressure vacuum to remove dissolved gases therefrom, subjecting the juice to the heat and kinetic energy of dry high velocity steam jets free from air while maintaining the pressure surrounding the juice at approximately 3 pounds per square inch absolute and continuing the treatment for approximately two minutes until sterility is obtained but stopping before appreciable thermo-chemical change is produced and then instantaneously cooling the liquid juice to a temperature below that sufficient to cause thermo-chemical change.

7. A process for preserving new fruit juice comprising the steps of rapidly pre-heating the juice out of the presence of air to a temperature below that necessary to cause thermo-chemical change, subjecting the juice to the heat and kinetic energy of high velocity dry steam jets free from oxygen and not over 230° F. while maintaining the pressure above the juice sufficient to maintain it at between 140° and 155° F. and continuing the treatment until sterility is obtained but stopping it before appreciable thermo-chemical change is produced and then instantaneously cooling the juice to a temperature below that necessary to produce thermo-chemical change.

GEORGE GRINDROD.